United States Patent
Bosselmann et al.

(10) Patent No.: US 8,559,772 B2
(45) Date of Patent: Oct. 15, 2013

(54) FIBER-OPTIC VIBRATION SENSOR

(75) Inventors: Thomas Bosselmann, Marloffstein (DE); Michael Villnow, Allersberg (DE); Michael Willsch, Jena (DE)

(73) Assignee: Siemens Aktiengesellschaft, München (DE)

( * ) Notice: Subject to any disclaimer, the term of this patent is extended or adjusted under 35 U.S.C. 154(b) by 243 days.

(21) Appl. No.: 13/101,340

(22) Filed: May 5, 2011

(65) Prior Publication Data

US 2011/0274386 A1   Nov. 10, 2011

(30) Foreign Application Priority Data

May 6, 2010   (DE) .......................... 10 2010 019 813

(51) Int. Cl.
*G02B 6/00* (2006.01)
(52) U.S. Cl.
USPC .............................................. 385/13; 385/12
(58) Field of Classification Search
USPC .......................................................... 385/13
See application file for complete search history.

(56) References Cited

U.S. PATENT DOCUMENTS

| 3,602,037 | A | * | 8/1971 | Neu ................................. 73/651 |
| 3,940,608 | A | | 2/1976 | Kissinger et al. |
| 4,414,471 | A | * | 11/1983 | Rines ........................ 250/227.14 |
| 5,420,688 | A | | 5/1995 | Farah |
| 6,008,898 | A | * | 12/1999 | Furstenau et al. ............ 356/519 |
| 7,714,271 | B1 | | 5/2010 | Levine |
| 2011/0274386 | A1 | * | 11/2011 | Bosselmann et al. ........... 385/12 |

FOREIGN PATENT DOCUMENTS

DE   19514852   10/1998
WO   9608695 A1   3/1996

OTHER PUBLICATIONS

Communication from European Patent Office, Aug. 26, 2011, pp. 1-8.

* cited by examiner

*Primary Examiner* — Rhonda Peace

(57) ABSTRACT

A fiber-optic vibration sensor for generators in power stations is disclosed. The sensor includes an optical fiber which has a freestanding end, wherein the freestanding end is caused to oscillate under the influence of vibrations, and the resulting oscillations are detected as a measure for the vibrations. Only the net weight of the optical fiber serves as a centrifugal mass.

6 Claims, 1 Drawing Sheet

FIBER-OPTIC VIBRATION SENSOR

CROSS REFERENCE TO RELATED APPLICATIONS

This application claims priority of European Patent Office application No. 10 2010 019 813.7 DE filed May 6, 2010, which is incorporated by reference herein in its entirety.

FIELD OF INVENTION

The invention relates to a fiber-optic vibration sensor, in particular for use in a generator.

BACKGROUND OF INVENTION

Generators in the power station field exhibit oscillations at double the line frequency in the region of the end-windings, inter alia. Damage to the insulation or, as the case may be, to the copper can occur at excessively high amplitudes of the bar oscillations. The damage can result in the destruction of the generator. Since the end-windings are at high-voltage potential, fiber-optic acceleration sensors (so-called FOAs=Fiber Optic Accelerometers) are increasingly used for monitoring such oscillations. An example of such an FOA operates with a centrifugal mass which is connected to an optical fiber and which is deflected by the occurring acceleration. The deflection can be transferred for example to a fiber Bragg grating (FBG), which is stretched as a result. A known method is also to convert the deflection of the centrifugal mass into a change in intensity of a light signal.

SUMMARY OF INVENTION

The object of the present invention is to disclose a fiber-optic vibration sensor which has a simplified design. At the same time it is directed in particular toward enabling important sensor parameters such as the resonant frequency and the linearity of the sensor characteristic to be set to suitable values.

This object is achieved by means of a fiber-optic vibration sensor having the features recited in the claims The dependent claims relate to advantageous embodiments of the invention.

According to the invention use is made in this case of an optical fiber which has a freestanding end. The freestanding end of the optical fiber is deflected by the inertial forces. The fiber terminating surface at the freestanding end is positioned immediately in front of a mirror inclined at an angle. If the glass fiber is deflected, more or less light is reflected back into the glass fiber, depending on the oscillation state.

According to the invention only the net weight of the fiber itself is used as the centrifugal mass. In other words, in contrast to known sensors of this type, no additional centrifugal mass is attached at the end of the fiber. This considerably simplifies the design of the vibration sensor.

In order to keep the resonant frequency sufficiently high relative to the operating frequency, typically 400 Hz, the chosen length of the fiber should beneficially be short enough. For high sensitivity, on the other hand, the greatest possible fiber length is advantageous.

In an advantageous embodiment of the invention a fiber length of between 12 and 18 mm is used for the freestanding end in the case of a standard multimode fiber 62/125 μm. In particular a fiber length of between 15 and 17 mm is chosen and according to an advantageous embodiment the fiber length equals 16 mm. A fiber length of 16 mm has proved advantageous in respect of resonant frequency and sensitivity.

According to an advantageous embodiment of the invention an 8° break of the end surface is used in order to avoid back-reflections at the terminating surface of the optical fiber. The azimuthal orientation of the fiber end relative to the mirror is beneficially chosen such that the break and the mirror surface include the maximum possible angle. In other words, break and mirror surface form a "V" shape. The oblique terminating surface causes the light to be refracted slightly downward—downward with reference to the shape of the "V"—out of the fiber, by approx. 3.5°. The effective angle of incidence onto the mirror is reduced as a result.

In an advantageous embodiment of the invention the mirror is tilted through between 9° and 13°. The azimuthal orientation of the fiber end relative to the mirror is beneficially chosen such that the break and the mirror surface include the maximum possible angle. In other words, break and mirror surface form a "V" shape. In particular the mirror is tilted through 11°.

It is advantageous if the distance of the glass fiber from the mirror is between 25 and 75 μm. The configuration described advantageously results in a relatively linear sensor characteristic between acceleration values of 0 and 10 g with a sensitivity of approximately 1%/g.

In order to simplify the design, all elements of the sensor head are preferably implemented as cylindrically symmetrical. The cylindrical sensor is then inserted into a rectangular block. A Teflon tube, 3-5 mm in diameter, in which the glass fiber is run loosely, acts as a feed line for example. At the end of the feed line is a connector for optical waveguides, for example Type FC-APC or E-2000.

BRIEF DESCRIPTION OF THE DRAWINGS

Preferred, though by no means limiting exemplary embodiments of the invention will now be explained in more detail with reference to the figures of the drawing, wherein the features are represented schematically and not necessarily true to scale, and in which.

DETAILED DESCRIPTION OF INVENTION

Figure 1:
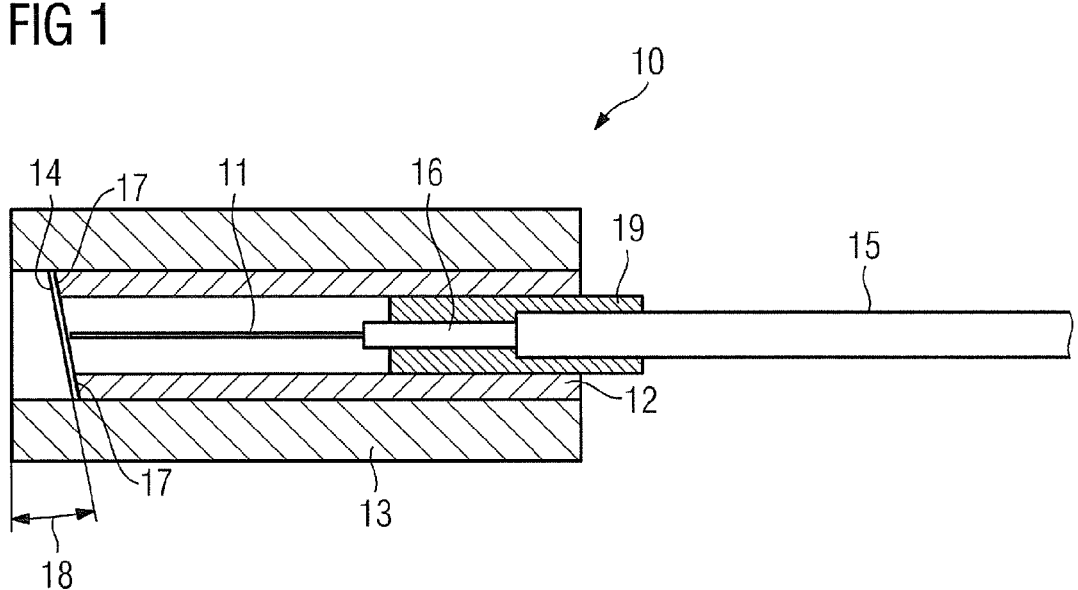
FIG. 1 shows a fiber-optic vibration sensor.

The fiber-optic vibration sensor 10 shown in FIG. 1 includes as an essential element a glass fiber 11. This is embodied as a multimode fiber 62/125 μm. A 16 mm-long section of the glass fiber 11 is freestanding. The glass fiber 11 ends at the end of said section. Immediately after the freestanding section the glass fiber 11 is fixed in a guide element 16. Further on from this the glass fiber 11 is routed loosely in a 3.7 mm-diameter Teflon tube 15.

The end of the Teflon tube 15 is enclosed together with the guide element 16 by a first sheath 19. A second sheath 12 is provided around the first sheath 19. The second sheath 12 extends from the region of the first sheath beyond the freestanding section of the glass fiber 11. On the end face, i.e. at the point where the glass fiber 11 ends, the second sheath 12 is terminated with an end beveled at an angle of 11°, which in the case of the cylinder-shaped second sheath 12 reveals itself in a circular-ring-shaped, beveled end 17. The second sheath 12 itself is open at this point, but is closed off by an aluminum glass mirror 14. The aluminum glass minor 14 is adhesively fixed on the beveled end, with the result that the aluminum glass mirror 14 itself is mounted obliquely with respect to the normal plane of the fiber axis.

A cuboid-shaped element 13 encloses the previously described structure from the level of the aluminum glass mirror 14 up to the first sheath 19. By virtue of the sheaths 19, 12 and the cuboid-shaped element 13 as well as the aluminum glass mirror 14 and the guide element 16, the freestanding section of the glass fiber 11 is completely sealed off from the outside world, thus preventing any external interference factors from affecting a measurement.

Figure 2:
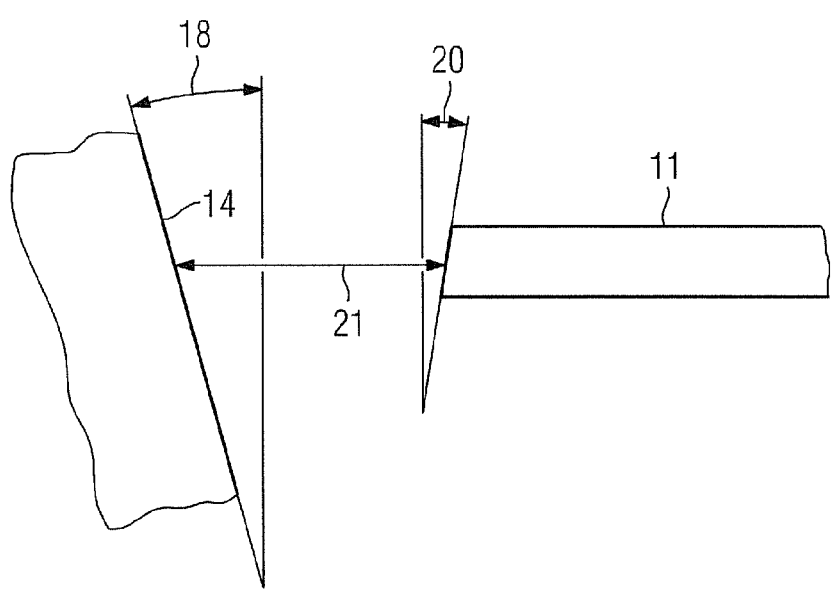
FIG. 2 shows a detail of the fiber-optic vibration sensor in an enlarged view.

An enlarged, not-to-scale representation of the end of the glass fiber 11 in relation to the aluminum glass mirror 14 is shown in FIG. 2. The end of the glass fiber 11 facing the aluminum glass mirror 14 is in this case beveled by means of a break, thereby substantially reducing back-reflections at the end of the glass fiber 11 itself The angle 20 equals 8° in this example. The aluminum glass mirror 14, which is no longer shown in full in the magnified view shown in FIG. 2, is arranged at an angle 18 of 11° to the normal plane of the glass fiber axis. The distance 21 between the end of the glass fiber 11 and the aluminum glass mirror 14 is equal to 50 μm in this example.

The bevels of the aluminum glass mirror 14 and the glass fiber 11 are aligned with respect to one another in such a way that they include the maximum angle to one another. Viewed from the side as in FIG. 2, the surfaces in this case form a "V" shape due to their relative position.

The invention claimed is:

1. A fiber-optic acceleration sensor, comprising:
   an optical fiber which includes a freestanding end which is embodied to be deflected under the influence of inertial forces,
   a mirror which is arranged inclined at a first angle of between 9° and 13° to the plane which stands vertically on the fiber axis from the freestanding end so as to reflect part of the light emerging from the freestanding end back into the optical fiber,
   wherein the freestanding end is caused to oscillate under the influence of vibrations,
   wherein the resulting oscillations are detected as a measure for the vibrations,
   wherein only a net weight of the optical fiber serves as a centrifugal mass,
   wherein a terminating surface of the freestanding end is formed by a break of the optical fiber having a second angle of between 5° and 11°, to the plane which stands vertically on the fiber axis, and
   wherein the break of the optical fiber and the mirror are aligned with respect to one another such that the terminating surface and the mirror together include a maximum possible angle.

2. The fiber-optic acceleration sensor as claimed in claim 1, wherein a length of the freestanding end is between 12 and 18 mm.

3. The fiber-optic acceleration sensor as claimed in claim 2, wherein the length of the freestanding end is between 15 and 17 mm.

4. The fiber-optic acceleration sensor as claimed in claim 1, wherein the optical fiber includes dimensions of 62/125 μm.

5. The fiber-optic acceleration sensor as claimed in claim 1, wherein the terminating surface of the freestanding end is formed by the break of the optical fiber having the first angle of between 7° and 9°, to the plane which stands vertically on the fiber axis.

6. The fiber-optic acceleration sensor as claimed in claim 1, wherein a distance between the fiber terminating surface and the mirror is between 25 μm and 75 μm.

* * * * *